(12) United States Patent
Tarokh et al.

(10) Patent No.: US 9,282,467 B2
(45) Date of Patent: Mar. 8, 2016

(54) SYSTEM AND METHOD FOR PILOT SEQUENCE DESIGN IN A COMMUNICATIONS SYSTEM

(71) Applicant: FutureWei Technologies, Inc., Plano, TX (US)

(72) Inventors: Vahid Tarokh, Cambridge, MA (US); Peiying Zhu, Kanata, CA (US); Gamini Senarath, Ottawa, CA (US)

(73) Assignee: Futurewei Technologies, Inc., Plano, TX (US)

( * ) Notice: Subject to any disclaimer, the term of this patent is extended or adjusted under 35 U.S.C. 154(b) by 122 days.

(21) Appl. No.: 14/090,322

(22) Filed: Nov. 26, 2013

(65) Prior Publication Data

US 2014/0146748 A1    May 29, 2014

Related U.S. Application Data

(60) Provisional application No. 61/731,284, filed on Nov. 29, 2012.

(51) Int. Cl.
| | | |
|---|---|---|
| *H04W 4/00* | (2009.01) | |
| *H04W 16/18* | (2009.01) | |
| *H04J 11/00* | (2006.01) | |
| *H04L 5/00* | (2006.01) | |
| *H04L 25/02* | (2006.01) | |
| *H04L 27/26* | (2006.01) | |
| *H04W 16/02* | (2009.01) | |

(52) U.S. Cl.
CPC ........... *H04W 16/18* (2013.01); *H04J 11/0023* (2013.01); *H04J 11/0053* (2013.01); *H04L 5/0035* (2013.01); *H04L 5/0048* (2013.01); *H04L 25/0226* (2013.01); *H04L 27/2613* (2013.01); *H04W 16/02* (2013.01)

(58) Field of Classification Search
None
See application file for complete search history.

(56) References Cited

U.S. PATENT DOCUMENTS

| | | | |
|---|---|---|---|
| 2009/0147668 A1 | 6/2009 | Manakkal et al. | |
| 2010/0208664 A1 | 8/2010 | Nishio et al. | |
| 2010/0272218 A1* | 10/2010 | Yeh et al. | 375/330 |
| 2013/0044685 A1* | 2/2013 | Fong et al. | 370/328 |

FOREIGN PATENT DOCUMENTS

| | | |
|---|---|---|
| CN | 101218845 A | 7/2008 |
| CN | 101860389 A | 10/2010 |
| WO | 2011100676 A1 | 8/2011 |

OTHER PUBLICATIONS

International Search Report and Written Opinion of Patent Cooperation Treaty (PCT), International Application No. PCT/CN2013/088120, Applicant Huawei Technologies, Co., Ltd., date of mailing Feb. 27, 2014, 12 pages.

* cited by examiner

*Primary Examiner* — Frank Duong
(74) *Attorney, Agent, or Firm* — Slater & Matsil, L.L.P.

(57) ABSTRACT

A method for pilot sequence design in a communications system includes selecting an initial cell in the communications system, and grouping other cells in the communications system relative to the initial cell into one of a neighbor group and a non-neighbor group in accordance with a neighborness measure of each of the other cells to the initial cell. The method also includes designing pilot sequences that are substantially orthogonal to one another for the initial cell and the other cells in the neighbor group, and providing information about the pilot sequences to the initial cell and the other cells in the communications system.

19 Claims, 11 Drawing Sheets

SYSTEM AND METHOD FOR PILOT SEQUENCE DESIGN IN A COMMUNICATIONS SYSTEM

This application claims the benefit of U.S. Provisional Application No. 61/731,284, filed on Nov. 29, 2012, entitled "System and Method for Pilot Design in a Wireless System," which application is hereby incorporated herein by reference.

TECHNICAL FIELD

The present disclosure relates generally to digital communications, and more particularly to a system and method for pilot sequence design in a communications system.

BACKGROUND

There is a desire to implement multi-cell/sector cooperation (e.g., coordinated multipoint (CoMP)) to provide additional capacity and additional coverage in wireless systems. CoMP, as well as other techniques, is expected to significantly increase available bandwidth in fourth generation (4G) and beyond communications systems. However, CoMP and the other techniques require knowledge of communications channels between transmitter(s) and receiver(s).

Generally, pilot sequences or simply pilots are signals transmitted by a transmission point (TP), such as an enhanced NodeB (eNB), also commonly referred to as a NodeB, base station, communications controller, controller, a cell, a remote radio head (RRH), and the like, to help a receiver, such as a user equipment (UE), also commonly referred to as mobile stations, mobiles, subscribers, terminals, users, and the like, estimate a communications channel between the eNB and the UE. Typically, pilots should be short since communications overhead increases rapidly with pilot length.

SUMMARY OF THE DISCLOSURE

Example embodiments of the present disclosure which provide a system and method for pilot sequence design in a communications system.

In accordance with an example embodiment of the present disclosure, a method for pilot sequence design in a communications system is provided. The method includes selecting, by a designing device, an initial cell in the communications system, and grouping, by the designing device, other cells in the communications system relative to the initial cell into one of a neighbor group and a non-neighbor group in accordance with a neighborness measure of each of the other cells to the initial cell. The method also includes designing, by the designing device, pilot sequences that are substantially orthogonal to one another for the initial cell and cells in the neighbor group, and providing, by the designing device, information about the pilot sequences to the initial cell and the other cells in the communications system.

In accordance with another example embodiment of the present disclosure, a method for pilot sequence design in a communications system is provided. The method includes selecting, by a designing device, an initial cell in the communications system, and grouping, by the designing device, other cells in the communications system into a neighbor group if the other cells in the communications system are determined to be significant interferers to the initial cell. The method also includes grouping, by the designing device, the other cells in the communications system into a non-neighbor group if the other cells in the communications system is determined to be insignificant interferers to the initial cell, and designing, by the designing device, pilot sequences that are substantially orthogonal to one another for the initial cell and cells in the neighbor group. The method further includes providing, by the designing device, information about the pilot sequences to the initial cell and the other cells in the communications system.

In accordance with another example embodiment of the present disclosure, a designing device is provided. The designing device includes a processor, and a transmitter operatively coupled to the processor. The processor selects an initial cell in a communications system, groups other cells in the communications system relative to the initial cell into one of a neighbor group and a non-neighbor group in accordance with a neighborness measure of each of the other cells to the initial cell, and designs pilot sequences that are substantially orthogonal to one another for the initial cell and cells in the neighbor group. The transmitter provides information about the pilot sequences to the initial cell and the other cells in the communications system.

One advantage of an embodiment is that pilot sequences are designed so that pilot sequences for eNBs that are significant interferers to one another are orthogonal (or substantially orthogonal) to each other so that the transmissions of the pilot sequences do not cause significant interference to one another.

A further advantage of an embodiment is that by considering only eNBs that are significant interferers to one another in the design of the pilot sequences, shorter pilot sequences may be used. The use of shorter pilot sequences reduces communications system overhead, thereby improving communications system efficiency.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to pilot sequence design. For example, a designing device selects an initial cell in the communications system, groups other cells in the communications system relative to the initial cell into one of a neighbor group and a non-neighbor group in accordance with a neighborness measure of each of the other cells to the initial cell, designs pilot sequences that are substantially orthogonal to one another for the initial cell and cells in the neighbor group, and provides information about the pilot sequences to the initial cell and the other cells in the communications system. As another example, a designing device selects an initial cell in the communications system, groups other cells in the communications system into a neighbor group if the other cells in the communications system are determined to be significant interferers to the initial cell, groups the other cells in the communications system into a non-neighbor group if the other cells in the communications system is determined to be insignificant interferers to the initial cell, designs pilot sequences that are substantially orthogonal to one another for the initial cell and cells in the neighbor group, and provides information about the pilot sequences to the initial cell and the other cells in the communications system.

The present disclosure will be described with respect to example embodiments in a specific context, namely a Third Generation Partnership Project (3GPP) Long Term Evolution (LTE) compliant communications system that uses pilot sequences transmitted by transmission points to assist UEs estimate communications channel quality. The disclosure may also be applied, however, to other standards compliant and non-standards communications systems that uses pilot sequences to assist in communications channel quality estimation.

Figure 1:
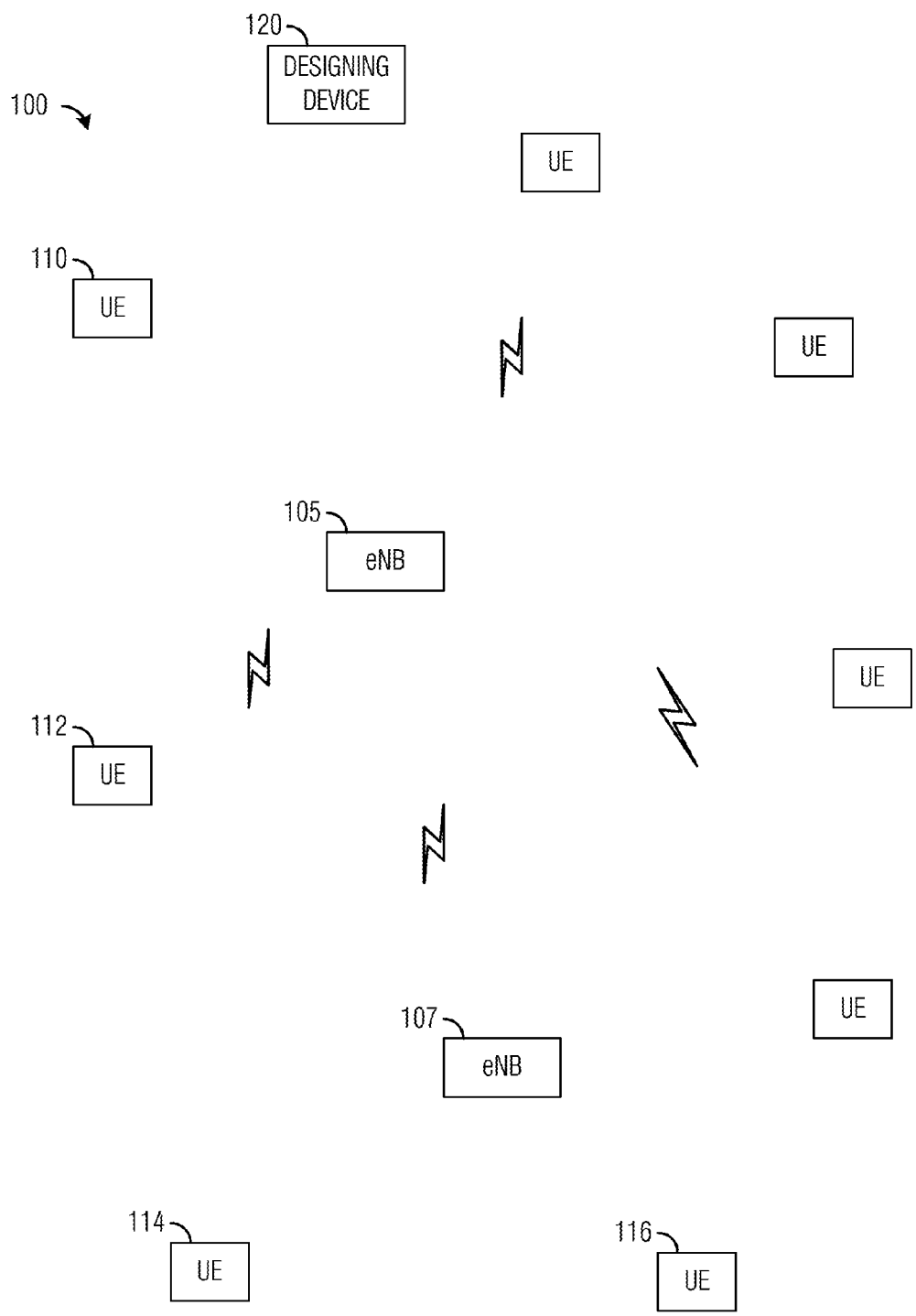
FIG. 1 illustrates an example communications system according to example embodiments described herein.

FIG. 1 illustrates an example communications system 100. Communications system 100 includes eNBs, such as eNB 105 and eNB 107. eNB 105 and eNB 107 may wirelessly serve a plurality of UEs, such as UE 110, UE 112, UE 114, and UE 116. Usually, communications to a UE or from a UE must flow through eNB 105. While it is understood that communications systems may employ multiple eNBs capable of communicating with a number of UEs, two eNBs and a number of UEs are illustrated in FIG. 1 for simplicity.

An eNB may use sectorized antennas to increase the number of UEs that the eNB can support. As an illustrative example, an eNB may use directional antennas with 120 degree sectors to divide its coverage area into three cell coverage areas. Each cell of the eNB may transmit independently of one another. Without loss of generality, the term cell may be used to refer to a portion of an eNB that through the use of a directional antenna communicates with a UE operating in a portion of the coverage area of the eNB, and cell coverage area may be used to refer to the corresponding portion of the coverage area of the cell. As an example, a cell may transmit a signal to a UE operating within its cell coverage area.

Figure 2A:
FIGS. 2a through 2c illustrate example pilot sequence transmission configurations according to example embodiments described herein.
Figure 2B:
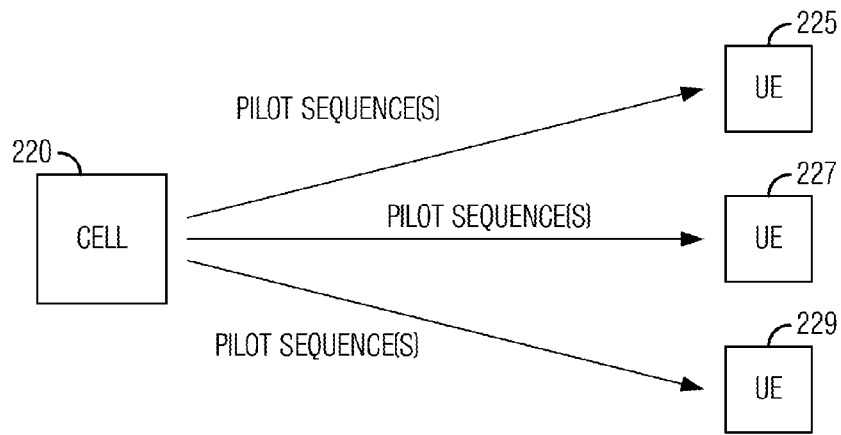
Figure 2C:
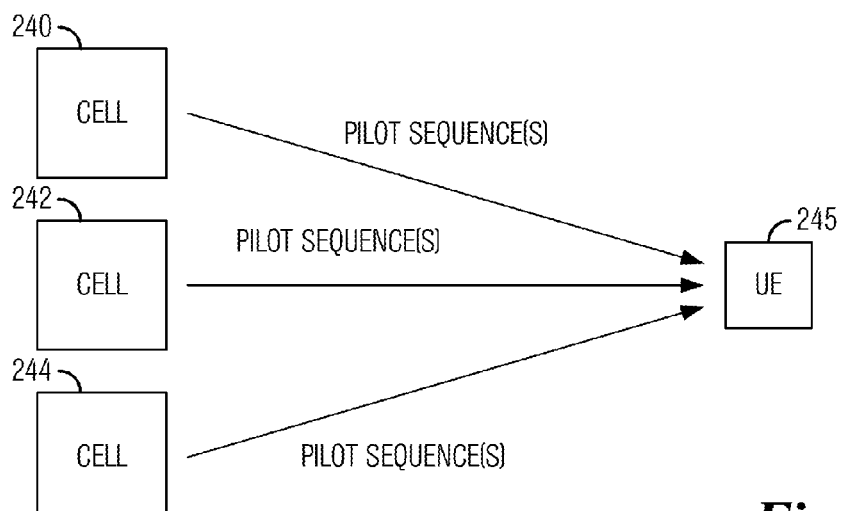

In a communications system, a transmission may occur in a number of different configurations. A first transmission configuration may be referred to as a one-to-one transmission where a cell may transmit to a single UE. FIG. 2a illustrates an example one-to-one transmission between a cell 205 and a UE 210. It is noted that the cell may be more generically referred to as a TP. A second transmission configuration may be referred as a one-to-many transmission where a cell may transmit to multiple UEs. FIG. 2b illustrates an example one-to-many transmission between a cell 220 and UEs 225, 227, and 229. A third transmission configuration may be referred to as a many-to-one transmission where multiple cells may transmit to a single UE. FIG. 2c illustrates an example many-to-one transmission between cells 240, 242, and 244 and UE 245. It is noted that other possible transmission configurations may be derived from combinations of these three transmission configurations.

As shown in FIGS. 2a through 2c, the cells may transmit pilot sequences (or equivalently pilots) to respective UEs to assist the UEs in estimating the communications channels between the cells and the UEs. Referring to FIG. 2a, cell 205 may transmit a pilot to UE 210 and UE 210 may use the pilot to estimate the communications channel between cell 205 and UE 210. Referring to FIG. 2b, cell 220 may transmit pilots to UEs 225, 227, and 229 and the UEs may use the pilots to estimate the three communications channels between cell 220 and the UEs. It is noted that the pilots transmitted by cell 220 may be the same or they may be different. Referring to FIG. 2c, cells 240, 242, and 244 may transmit unique pilots to UE 245 UE 245 may use the unique pilots to estimate the three communications channels between cells 240, 242, and 244 and itself.

Referring back now to FIG. 1, communications system 100 also includes a designing device 120. Designing device 120 may be used to design pilots for cells in communications system. Designing device 120 may design the pilots for the cells and store them for subsequent use, provide information about the pilots to the cells, or a combination thereof. It is noted that designing device 120 may be a stand-alone entity in communications system 100 as shown in FIG. 1. However, designing device 120 may be co-located with another entity in communications system 100. As an illustrative example, designing device 120 may be co-located with an eNB or some other network entity that is part of the infrastructure of communications system 100.

Figure 3:
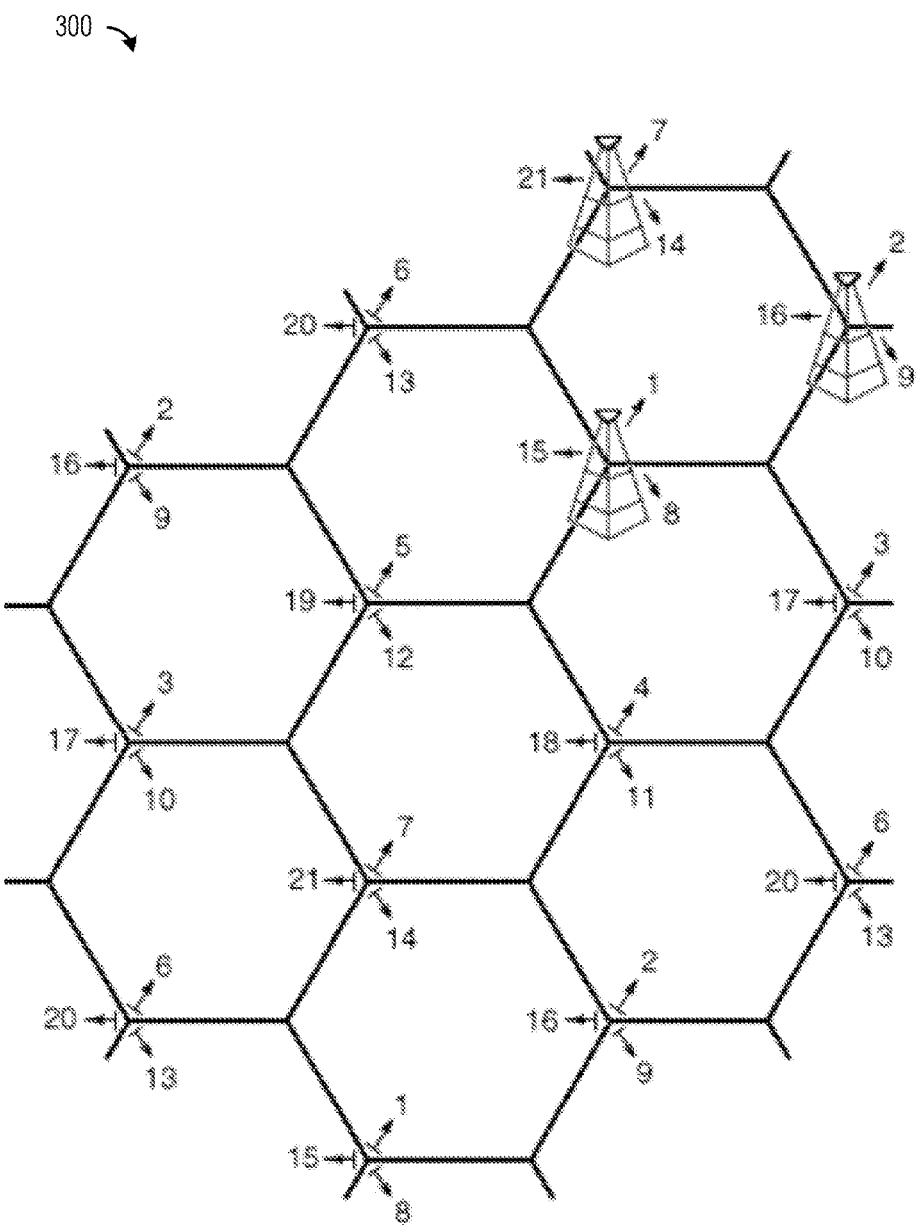
FIG. 3 illustrates an example communications system with sectorized eNBs according to example embodiments described herein.

FIG. 3 illustrates an example communications system 300 with sectorized eNBs. As shown in FIG. 3, each eNB utilizes 120 degree directional antennas, thereby resulting in three cells (or TPs) per eNB. For illustrative purposes, consider a situation wherein there are 57 UE operating in communications system 300. With 57 UEs, 57 orthonormal pilots of length 57 are used to allow each UE to estimate the 57 communications channels (from each of the 57 cells) without interference. Two pilots are said to be orthonormal if they are orthogonal to each other and have unit vectors. It is then possible to express a received signal at a UE as $$r = P\Lambda + n,$$

where r represents the received 57×1 vector at the UE, vector $\Lambda$ represents the 57 communications channels to the UE, and n represents the noise vector.

In order to estimate the communications channels, it may be necessary to determine $P^*r$ as an estimate of $\Lambda$. It is noted that the estimation achieves the Cramer-Rao lower bound, so it may be optimal. However, pilots of length 57 may be too long for practical use. Furthermore, there are typically more than 57 cells, so interference may be a problem even if length 57 pilots are used.

To avoid confusion between pilots transmitted by cells, each cell may transmit a different pilot. The use of different pilots may enable the UEs to identify the source of the pilots. Sequences or transmissions of sequences from two or more cells occurring at the same time, the same frequency, and/or the same time and frequency may cause interference with one another unless the transmissions are orthogonal (or substantially orthogonal) to one another. Two sequences may be said to be orthogonal to each other if a correlation between the two sequences is equal to zero. Similarly, two sequences may be said to be substantially orthogonal to each other if the correlation between the two sequences is equal to zero plus/minus a threshold (where the threshold may be specified by a technical standard, an operator of the communications system, and the like). The threshold specifies a degree to which the two sequences may not be orthogonal to each other but still considered to be substantially orthogonal.

It is noted that in most cases, transmissions from far away cells will cause less interference at a UE than transmissions from close in cells. For example, a few communications channels from a few cells detectable by a UE may be strong enough to cause significant interference, and the communications channels from neighboring cells may be of significance. However, due to channel variations, it may be possible that some communications channels from non-neighboring channels are strong enough to cause significant interference. For discussion purposes, assume that 1<N of the channel coefficients is strong enough to be worth an estimation at the UE and the remainder of the channel coefficients are zeroes. If it is known in advance which of the cells is of importance, then, in the absence of noise, pilots of length 1 may be used to estimate these communications channels at UE j. In such a situation, the pilots may be chosen to be orthogonal or substantially orthogonal to each other (e.g., columns of a Fourier matrix of size 1×1).

However, the UEs generally do not know which of the underlying communications channels from the cells are significant interferers. Nevertheless, there are some communications channels that are more likely to be significant interferers than other communications channels. In other words, the UE has a belief or probability value of a communications channel being significant interferer. The information may be used to design shorter pilots while providing good performance.

It may be able to categorize cells (and their attendant communications channels) in accordance with the significance of their interference to a UE. As an illustrative example, there may be three levels of significance: very significant, possibly significant, and not significant (or insignificant). It is noted that a different number of levels may be used. Therefore, the discussion of three levels of significance should not be construed as being limiting to either the scope or the spirit of the example embodiments.

A cell (due to its communications channel to the UE) may be categorized as a very significant interferer to the UE in accordance with geographical criteria, such as, if it is a neighboring cell to a cell serving the UE. It is noted that a first cell may be a neighboring cell to a second cell if the first cell is a geographical neighbor of the second cell, meaning that the first cell is adjacent to the second cell. It is also noted that the first cell may be a neighboring cell to the second cell if the first cell meets one or more signal and/or interference criteria. Examples of the signal and/or interference criteria may include a signal strength of transmissions made by the first cell as received by the UE in the second cell meets a first threshold, a signal to noise ratio of transmissions made by the first cell as received by the UE in the second cell meets a second threshold, a signal to interference plus noise ratio of transmissions made by the first cell as received by the UE in the second cell meets a third threshold, and the like. Geographical criteria, signal and/or interference criteria, or a combination thereof may be used to categorize a cell as a significant interferer.

A cell may be categorized as an insignificant interferer to the UE in accordance with geographical criteria, such as, if it is a distant cell to a cell serving the UE. It is noted that a first cell may be a distant cell to a second cell if the first cell is located far away from a second cell, meaning that there is a large amount of separation between the first cell and the second cell. It is also noted that the first cell may be a distant cell to the second cell if the first cell meets one or more signal and/or interference criteria. Examples of the signal and/or interference criteria may include a signal strength of transmissions made by the first cell as received by the UE in the second cell meets a fourth threshold, a signal to noise ratio of transmissions made by the first cell as received by the UE in the second cell meets a fifth threshold, a signal to interference plus noise ratio of transmissions made by the first cell as received by the UE in the second cell meets a sixth threshold, and the like. Geographical criteria, signal and/or interference criteria, or a combination thereof may be used to categorize a cell as an insignificant interferer.

A cell may be categorized as a possibly significant interferer to the UE in accordance with geographical criteria, such as, if the cell is neither a significant interferer nor an insignificant interferer. Transmissions from a possibly significant interferer may or may not cause significant interference depending on variations in channel conditions. For example, a first cell that is a possibly significant interferer to a second cell may be located relatively close to the second cell but not so close that it would be categorized as a significant interferer. It is noted that it is also possible to categorize a cell according to signal and/or interference criteria. Examples of the signal and/or interference criteria may include a signal strength of transmissions made by a first cell as received by the UE in a second cell meets a seventh threshold, a signal to noise ratio of transmissions made by the first cell as received by the UE in the second cell meets an eighth threshold, a signal to interference plus noise ratio of transmissions made by the first cell as received by the UE in the second cell meets a ninth threshold, and the like. Geographical criteria, signal and/or interference criteria, or a combination thereof may be used to categorize a cell as a possibly significant interferer.

Figure 4A:
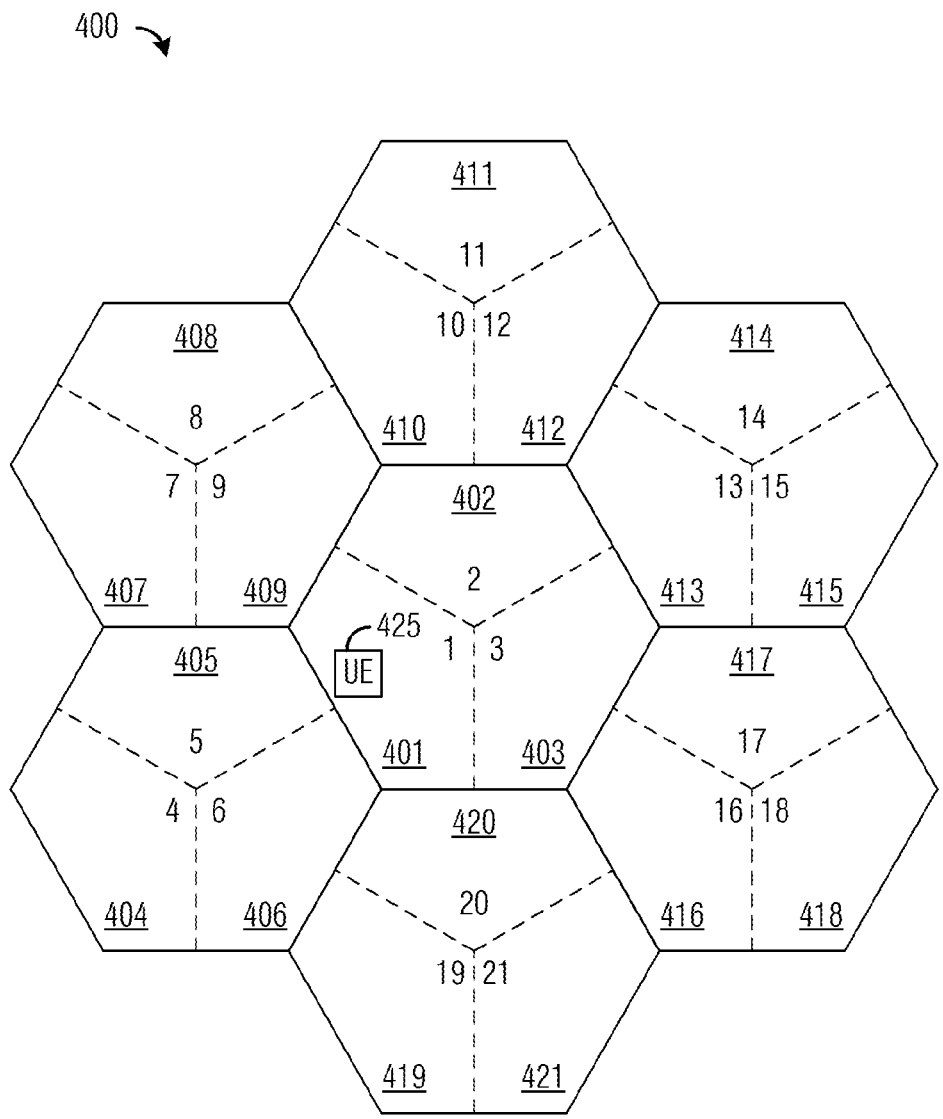
FIGS. 4a through 4c illustrate example cell groups of a communications system wherein eNB are using directional antennas with 120 degree sectors according to example embodiments described herein.

FIG. 4a illustrates a portion of an example communications system 400 wherein eNBs are using directional antennas with 120 degree sectors. Seven eNBs of communications system 400 are shown in FIG. 4a. With the coverage area of each eNB being partitioned into 3 cells, there are a total of 21 cells, numbered from 1 to 21 (the cells are shown with reference numerals 401 to 421). Also shown in FIG. 4a is UE 425 that is operating in cell 401. It is noted that although the discussion focuses on communications systems with the coverage areas of each eNB partitioned into 3 cells, the example embodiments presented herein are operable with communications systems with coverage areas being partitioned into any number of cells. The example embodiments are also operable in communications systems with coverage areas partitioned into different numbers of cells. Furthermore, the example embodiments are operable with heterogeneous communications systems with eNBs having different capabilities, such as different transmission power, resource availability, and the like, i.e., heterogeneous networks (HetNets).

Figure 4B:
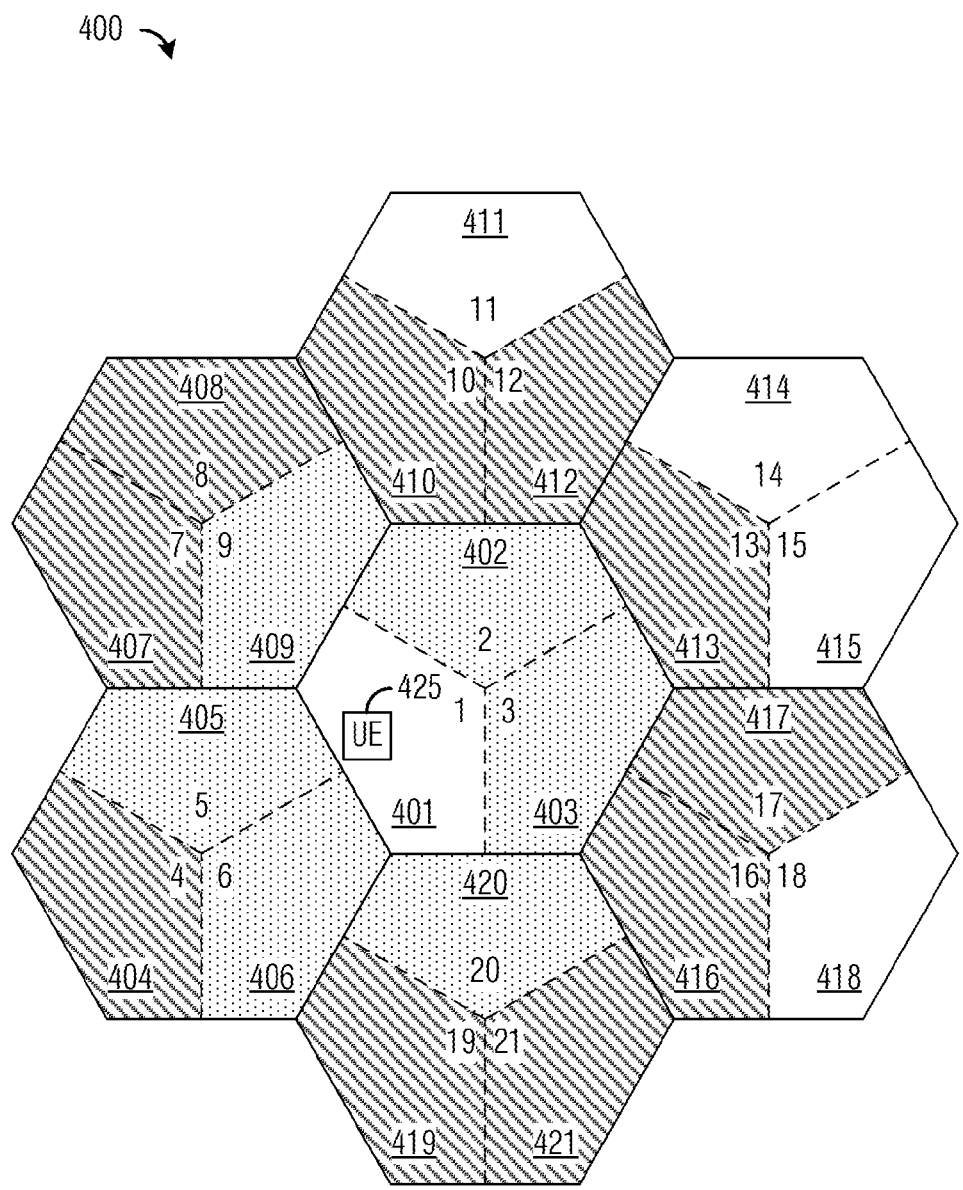

FIG. 4b illustrates an example categorization of cells in communications system 400 relative to cell 401. For discussion purposes, the categorization of cells relative to cell 401 will be made in accordance with geographical information. It is noted that the categorization of cells may be in accordance with geographical, signal and/or interference, or a combination thereof. As an example, a cell that is adjacent to cell 401 may be categorized as a significant interferer to cell 401. Hence, cells 402, 403, 405, 406, 409, and 420 are categorized as significant interferers to cell 401 (these cells are shown highlighted with a dotted hashing pattern). As another example, a cell that is adjacent to a significant interferer of cell 401 may be categorized as a possibly significant interferer to cell 401. Therefore, cells 404, 407, 408, 410, 412, 413, 416, 417, 419, and 421 are categorized as possibly significant interferers to cell 401 (these cells are shown highlighted with a diagonal line hashing pattern). As yet another example, remaining cells may be categorized as insignificant interferers to cell 401. As shown in FIG. 4b, cells 411, 414, 415, and 418 are categorized as insignificant interferers to cell 401. It is noted that FIG. 4b illustrates an example of categorization of cells and that other example categorizations of cells are possible. Furthermore, the use of different categorization criteria may result in different categorizations. It is also noted that FIG. 4b shows a portion of communications system 400. There may be additional cells that are not shown in FIG. 4b and therefore, are not discussed herein.

Figure 4C:
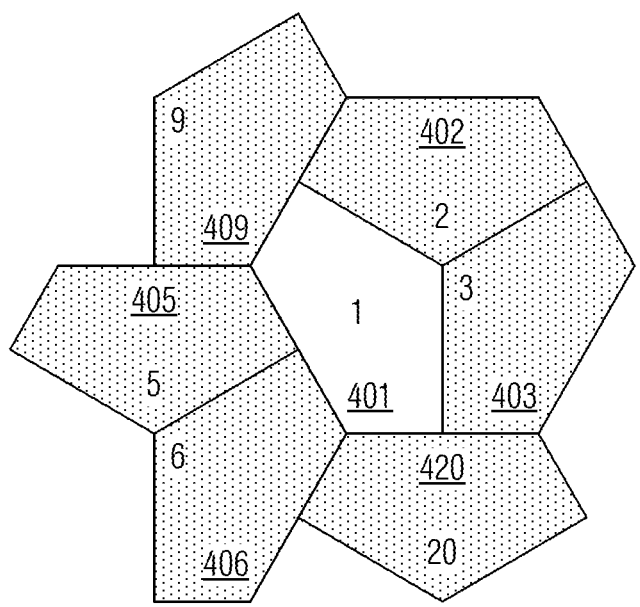

FIG. 4c illustrates an example of grouping 450 of cell 401 and its significant interferers. As discussed above, the significant interferers of cell 401 are categorized in accordance with geographical categorization criteria and that the use of different categorization criteria may result in a different group of cells. In one example, a neighborness measure may be used to group cells. A neighborness measure for a first cell may be relative to a second cell and may be based on one or more geographical criteria, one or more signal criteria, one or more interference criteria, and the like. As an illustrative example, consider a first cell that is adjacent to a second cell and remote to a third cell. By utilizing distance as a geographical criterion, the neighborness measure of the first cell to the second cell may be high while the neighborness measure of the first cell to the third cell may be low. The comparison of the neighborness measure to one or more thresholds may be used to categorize the cells, as neighbors, non-neighbors, and the like. It is noted that grouping 450 is for cell 401 and that different cells may have different groupings.

It is noted that transmissions (e.g., data transmissions, as well as control information transmissions including pilots) from cells categorized as insignificant interferers to another cell may cause little to no interference to the other cell. According to an example embodiment, since the transmissions of cells categorized as insignificant interferers to the other cell may cause little to no interference to the other cell, it may be possible for the insignificant interferers to the other cell and the other cell to transmit pilots that are not orthogonal or not substantially orthogonal without producing undue interference. The relaxation of the orthogonality requirement allows the pilots to be shorter (due to the potentially smaller number of orthogonal pilots), thereby reducing communications overhead and improving communications system efficiency.

According to an example embodiment, the knowledge of the categorization of the cells permits the determination of significant interferers as well as possibly significant interferers (i.e., cells that, on occasion, are significant interferers). The knowledge of the categorization of the cells may be used to design pilots such that a span of the pilots corresponding to significant interferers are orthogonal or substantially orthogonal to a span of the pilots corresponding to possibly significant interferers.

According to an example embodiment, a variety of techniques may be used to categorize the cells. As an example, a designing device, such as a controller or an eNB designated to perform pilot design, a network entity dedicated for pilot design, and the like, may categorize the cells based on typical communications system deployment scenarios, and perform simulations to determine the categorization. Alternatively, the categorization may be dynamically updated when the communications system is changed or modified. In such a situation, the designing device may obtain communications system information from feedback provided by UE, such as reference signal received power (RSRP) reports), and use the information to form a neighbor list, an interference map, and the like. The neighbor list, the interference map, and the like, may be similar to those used in inter-cell interference coordination (ICIC) self-configuration or configurable radio access network (CRAN) self-clustering. The categorization may then be derived from the information and/or the neighbor list, the interference map, and the like.

A model of the communications occurring in the communications system is used in the discussion of pilot design. The model is as follows: let the cells be labeled 1, 2, ..., N with a UE located in cell 1; let the communications channels between cells 1, 2, ..., N and the UE be denoted $\alpha_1$, $\alpha_2$, ..., $\alpha_N$; assume that the communications channels remain static during pilot transmission; assume that the communications channel have to be estimated with at most 1 of them causing significant interference. Suppose that the pilots $P_i$ are designed for use by cell i and length m. In summary, $$P_i = \begin{pmatrix} p_{1,i} \\ p_{2,i} \\ \vdots \\ p_{m,i} \end{pmatrix};$$

$$R = \begin{pmatrix} r_1 \\ r_2 \\ \vdots \\ r_m \end{pmatrix};$$

$$\Lambda = \begin{pmatrix} \alpha_1 \\ \alpha_2 \\ \vdots \\ \alpha_m \end{pmatrix};$$

and $$n = \begin{pmatrix} n_1 \\ n_2 \\ \vdots \\ n_m \end{pmatrix},$$

Where R is the received signal at the UE, n is the noise vector, and Λ is the channel matrix. It is possible to express R as $R = P\Lambda + n.$ An optimal solution may be derived if the designing device has partial information about cells that are significant. For example, an information source may provide the information about some but not all of the cells that are significant interferers. Without loss of generality, assume that the partial information comprises 1, 2, . . . , r. At most 1−r of the other cells are significant interferers, but their locations are unknown. Let $P_1$ denote a matrix corresponding to columns 1, 2, . . . , r of P, and $P_2$ denote a matrix corresponding to the remaining columns of P. Let $\Lambda_1$ denote a vector that corresponds to rows 1, 2, . . . , r of $\Lambda$, and $\Lambda_2$ denote a vector corresponding to the remaining rows of $\Lambda$. Then, $$P\Lambda = P_1\Lambda_1 + P_2\Lambda_2.$$

If the column spaces of $P_1$ and $P_2$ are denoted by $W_1$ and $W_2$ can be designed to be orthogonal to each other, then by determining the projection of R on $W_1$, ($\mathrm{Proj}_{W_1}(R)$), it may be possible to eliminate the contribution of $P_2W_2$ on R. In other words, $$\mathrm{Proj}_{W_1}(R) = P_1\Lambda_1 + \mathrm{Proj}_{W_1}(n).$$

In such a situation, $\mathrm{Proj}_{W_1}(n)$ is known to be an independently and identically distributed (i.i.d.) Gaussian and the Cramer-Rao bound is achieved if the columns of $P_1$ (i.e., the pilots corresponding to the known significant cells) are orthogonal to each other. The Cramer-Rao bound coincides with that of a situation when all of the channels of $\Lambda_2$ are zeros, which is the best that is theoretically possible for any given pilot.

Similarly, it is possible to express $\mathrm{Proj}_{W_2}(R)$ as $$\mathrm{Proj}_{W_2}(R) = P_2\Lambda_2 + \mathrm{Proj}_{W_2}(n).$$

It is noted that $\Lambda_2$ has 1−r non-zero significant coefficients. The locations of the non-zero elements of $\Lambda_2$ are not known, which may be reminiscent of compressed sensing. Additionally, m may be chosen so that the non-zero coefficients can be retrieved. In such a situation, a good choice for pilot matrix $P_2$ may be a measurement matrix for compressed sensing.

According to an example embodiment, an ideal set of pilots for a UE are such that the span of the pilots corresponding to cells categorized as significant interferers to the UE is orthogonal or substantially orthogonal to the span of pilots corresponding to cells categorized as possibly significant interferers to the UE. Furthermore, the pilots corresponding to cells categorized as significant interferers to the UE are orthogonal or substantially orthogonal to each other. Additionally, a matrix with columns comprising pilots of cells categorized as possibly significant interferers to the UE may be a good measurement matrix for compressed sensing. Also, the pilots should be as short as possible to help reduce communications overhead and improve overall communications system performance.

However, the information source that provides the information about some but not all of the cells that are significant interferers does not exist. However, devices operating in the communications system likely have ideas about which cells are significant interferers, possibly significant interferers, and insignificant interferers to them. Therefore, it is possible to conclude that an ideal set of pilots for a UE usually are such that the span of the pilots corresponding to cells that are likely to be significant interferers to the UE is orthogonal or substantially orthogonal to the span of pilots corresponding to cells that are likely to be possibly significant interferers to the UE. Furthermore, the pilots corresponding to cells that are likely to be significant interferers to the UE are orthogonal or substantially orthogonal to each other. Also, a matrix with columns equal to the pilots of cells likely to be possibly significant interferers to the UE is a good measurement matrix for compressed sensing. Additionally, the pilots are as short as possible to help reduce communications overhead and improve overall communications system performance.

Figure 5:
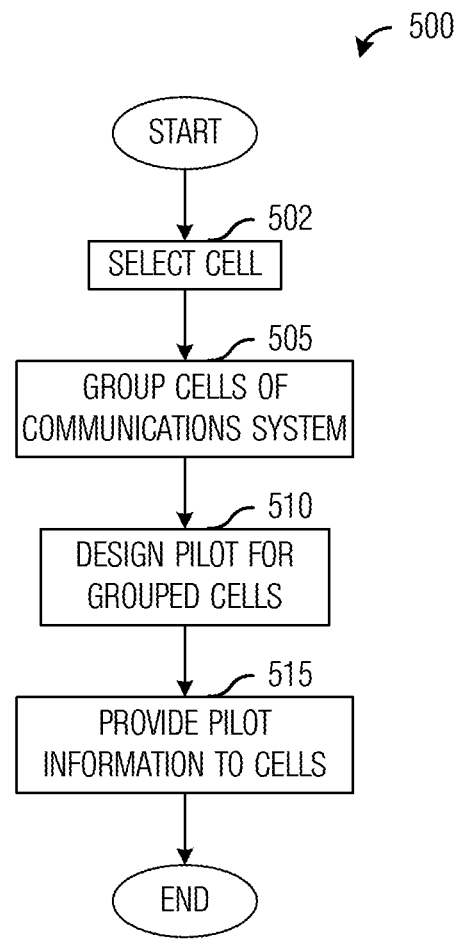
FIG. 5 illustrates an example flow diagram of operations occurring in a designing device as the designing device designs pilot sequences for use in a communications system according to example embodiments described herein.

FIG. 5 illustrates an example flow diagram of operations 500 occurring in a designing device as the designing device designs pilots for use in a communications system. Operations 500 may be indicative of operations occurring in a designing device, such as designing device 120, an eNB in the communications system, a network entity, and the like, as the designing device designs pilots for use by cells of the communications system.

Operations 500 may begin with the designing device selecting a cell (block 502). The designing device may group cells in the communications system (block 505). The grouping of the cells in the communications system may be relative to the selected cell. The designing device may randomly select a cell in the communications system and group the cells in the communications system relative to the selected cell. Alternatively, the designing device may specifically select a cell. As an example, the designing device may select a cell with a specified identifier, a cell with the largest number of UE, a cell with the greatest traffic load, a cell with the smallest number of UE, a cell with the smallest traffic load, and the like. A detailed discussion of an example cell grouping technique is presented below.

Figure 6:
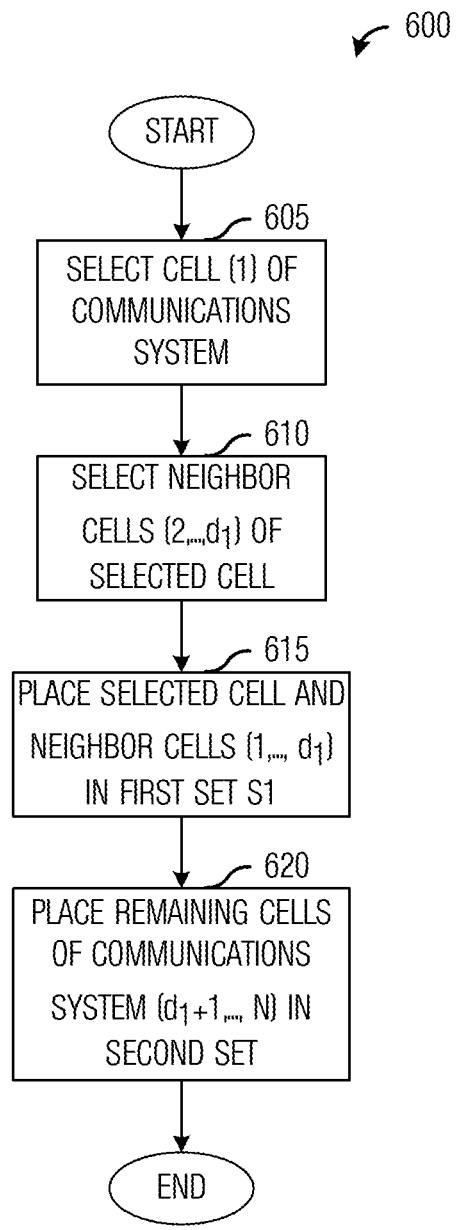
FIG. 6 illustrates an example flow diagram of operations occurring in a designing device as the designing device groups cells in the communications system according to example embodiments described herein.

FIG. 6 illustrates an example flow diagram of operations 600 occurring in a designing device as the designing device groups cells in the communications system. Operations 600 may be indicative of operations occurring in a designing device, such as designing device 120, an eNB in the communications system, a network entity, and the like, as the designing device groups cells in the communications system.

Operations 600 may begin with the designing device selecting a cell in the communications system (block 605). As discussed previously, the designing device may select the cell at random or apply selection criteria. Examples of selection criteria include a cell with a specified identifier, a cell with the largest number of UE, a cell with the greatest traffic load, a cell with the smallest number of UE, a cell with the smallest traffic load, and the like. The designing device may re-label the selected cell as cell 1 to help simplify notation. The selected cell is shown in FIG. 4b as the unshaded cell (cell 401). The selected cell may also be referred to as an initial cell.

The designing device may select neighbor cells of the selected cell (block 610). The neighbor cells may be selected using a neighborness measure relative to the selected cell. For discussion purposes, the neighbor cells are selected solely on geographical criteria. However, neighbor cells may also be selected on signal and/or interference criteria, or a combination of geographical and signal and/or interference criteria. The neighbor cells may be re-labeled cells 2, . . . , $d_1$. The neighbor cells of the selected cell are shown in FIG. 4b as the cells with a dotted hatching pattern. The designing device may place the selected cell (cell 1) and the neighbor cells (cells 2, . . . , $d_1$) into a first set $S_1$ (block 615). The first set $S_1$ includes cells 1, 2, . . . , $d_1$. The remaining cells in the communications system may be re-labeled as cells $d_1+1$, . . . , N and placed in a second set (block 620).

As discussed previously, the grouping of the cells may be made in accordance to a neighborness measure of the cells to the selected cell. As an illustrative example, a cell may be grouped in the neighbor group if the neighborness measure relative to the selected cell for the cell meets a threshold and the cell may be grouped in the non-neighbor group if the neighborness measure relative to the selected cell for the cell does not meet the threshold. The neighborness measure relative the selected cell for the cell may be measured by the cell and reported to the designing device through the use of the RSRP, for example. It is also noted that although the discussion focuses interference being used as the neighborness measure, other measurements, such as signal to noise (SNR), signal to interference plus noise ratio (SINR), and the like, may be used as the neighborness measure(s). It is further noted that multiple measurements may be used as neighborness measures. The designing device may also make the interference measurement itself.

It is also noted that the grouping of the cells may be made according to the categorization of the cells, e.g., significant interferer, possibly significant interferer, and insignificant interferer, based on a neighborness measure. As previously noted, the categorization of the cells may be performed in accordance with measurements reported by the UEs and/or cells or made by the designing device, such as interference, SNR, SINR, and the like. The use of cell categories may simplify the grouping of the cells.

Referring back now to FIG. 5, with the cells of the communications system grouped according to their capability of causing interference to the selected cell, the designing device may design pilots for the grouped cells (block 510). In one example, the grouped cells are the cells in the first set $S_1$ that includes cells 1, 2, . . . , $d_1$. The designing device may design the pilots in such a way that the pilots for the grouped cells are orthogonal or substantially orthogonal to the pilots of the cells that are not grouped cells, e.g., cells that are not included in the first set $S_1$. Furthermore, the pilots for the grouped cells are orthogonal or substantially orthogonal to one another. A detailed discussion of an example pilot design technique is presented below. The designing device may provide information about the pilots to the cells of the communications system (block 515). As an example, the designing device may transmit the pilots to the cells of the communications system. As another example, the designing device may transmit indicators of the pilots to the cells of the communications system.

Figure 7:
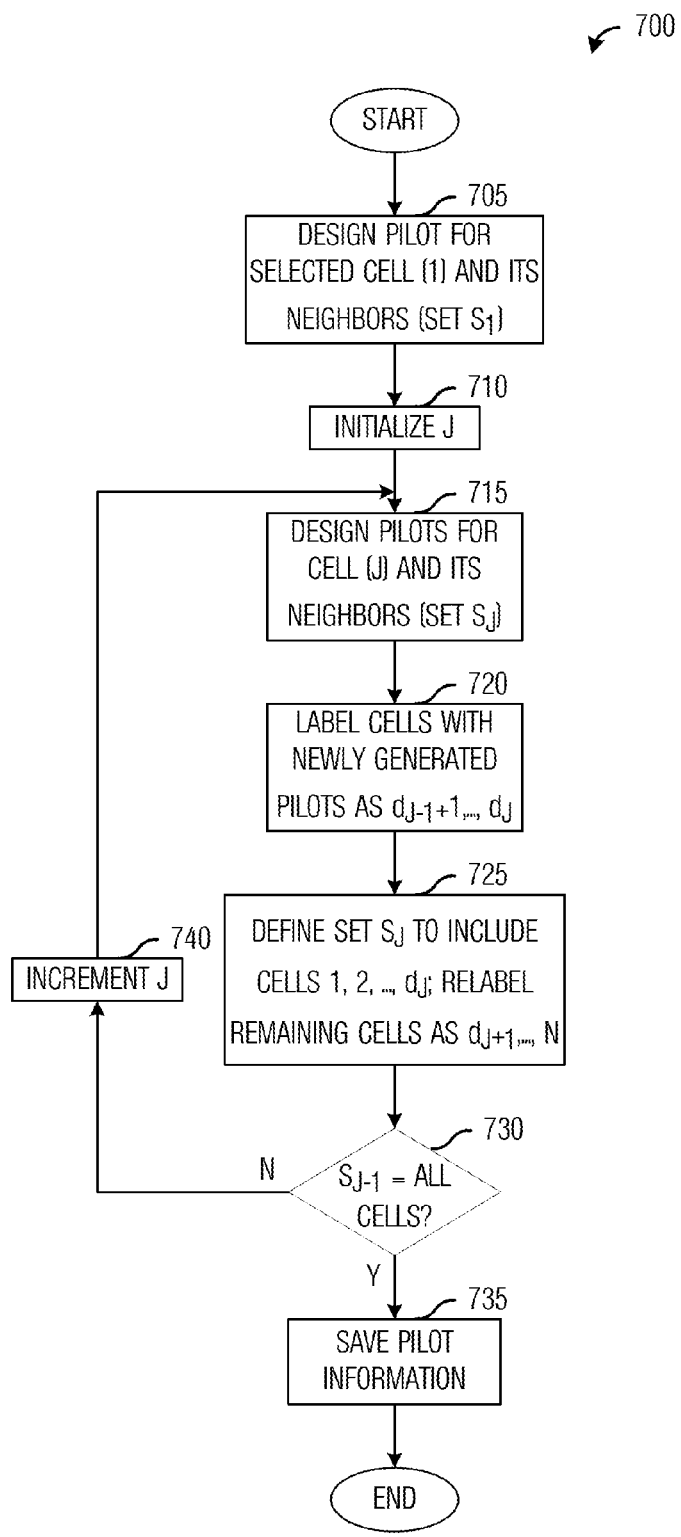
FIG. 7 illustrates an example flow diagram of operations occurring in a designing device as the designing device designs pilot sequences for cells in a communications system according to example embodiments described herein.

FIG. 7 illustrates an example flow diagram of operations 700 occurring in a designing device as the designing device designs pilots for cells in a communications system. Operations 700 may be indicative of operations occurring in a designing device, such as designing device 120, an eNB in the communications system, a network entity, and the like, as the designing device designs pilots for grouped cells.

Operations 700 may begin with the designing device designing pilots for the selected cell and its neighboring cells, i.e., the members of the first set $S_1$ (block 705). The designing device may design the pilots for the selected cell and its neighboring cells (the members of the first set $S_1$) by selecting pilots for the selected cell and its neighboring cells so that they are orthogonal or substantially orthogonal to one another. Since the designing device does not need to consider all of the cells in the communications system, the pilots may be shorter. Additionally, the selection of a smaller number of shorter pilots may be less computationally intensive than the selection of a larger number of longer pilots, which may reduce the computational load on the designing device. A detailed discussion of an example pilot design process is provided below.

Figure 8:
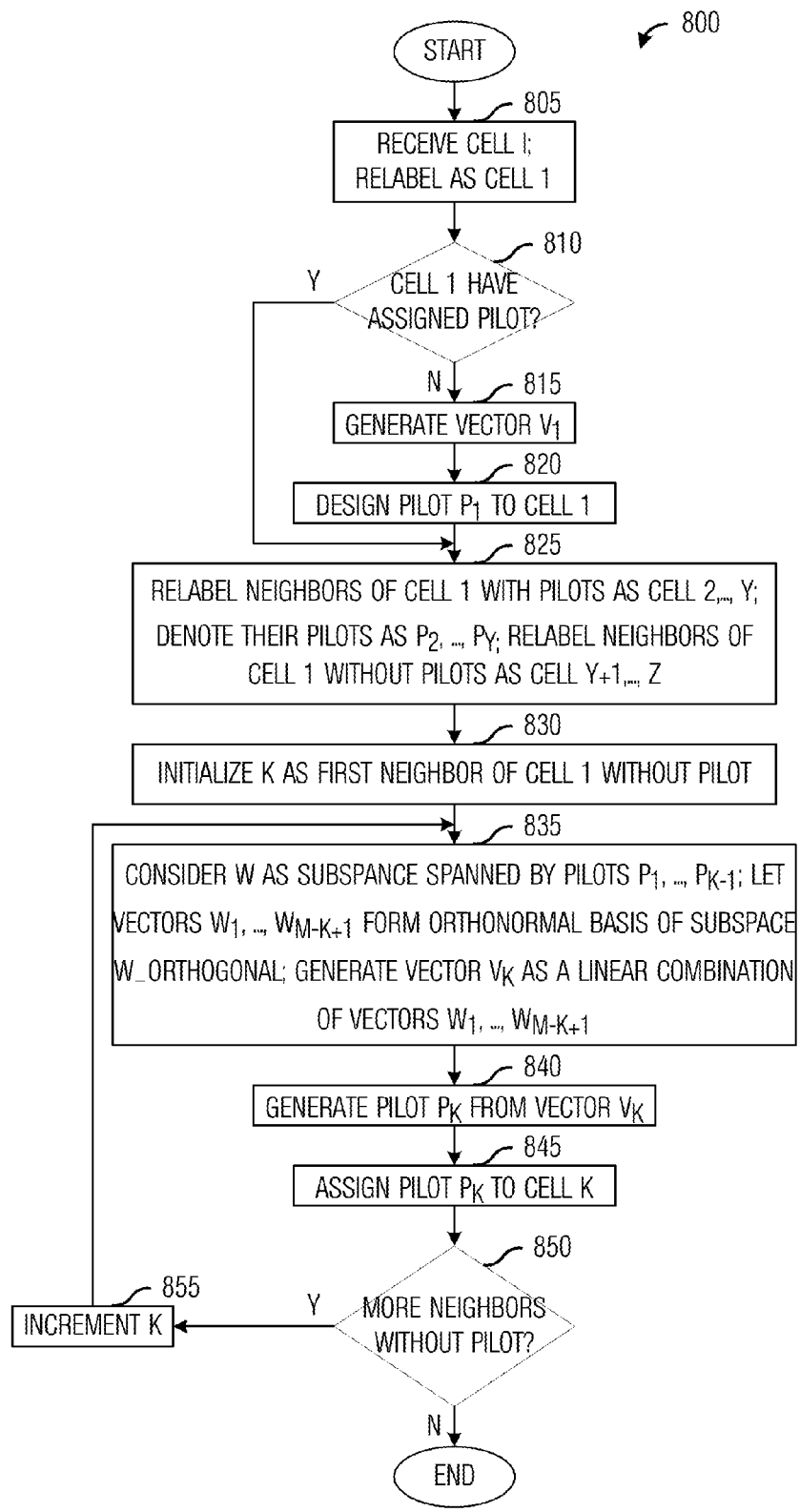
FIG. 8 illustrates an example flow diagram of operations occurring in a designing device as the designing device designs pilot sequences for a group of cells according to example embodiments described herein.

FIG. 8 illustrates an example flow diagram of operations 800 occurring in a designing device as the designing device designs pilots for a group of cells. Operations 800 may be indicative of operations occurring in a designing device, such as designing device 120, an eNB in the communications system, a network entity, and the like, as the designing device designs pilots for a group of cells, e.g., the cells in the first set $S_1$.

Operations 800 may begin with the designing device initiating the pilot design process for a cell i, which is relabeled as cell 1 (block 805). It is noted that cell 1 as referenced in operations 800 is different from cell 1 as referenced in the discussion of FIG. 6. Here, cell i is relabeled as cell 1 to simplify the discussion of the pilot design process. The designing device may perform a check to determine if cell 1 already has a pilot (block 810). If a cell, such as cell 1, already has a pilot, there is not a need to design another pilot for this cell. However, in some situations, it may be desirable to design another pilot for cell 1. In such a situation, the designing device may design a pilot for cell 1. As an example, if there are multiple pilots for cell 1, the designing device may select a pilot that provides better orthogonality or the multiple pilots may be used by cell 1 in different communications situations.

If cell 1 does not have a pilot (block 810), the designing device may design a pilot for cell 1. The designing device may generate a vector $v_1$ that is an i.i.d. Gaussian that has a distribution N(0, 1) (block 815). The vector $v_1$ may be a m×1 column vector, where m is the length of the pilot. As an example, m may be set to be on the order of max (2d−1, d+2f), where d (or d−1) is the maximum number of neighbor cells of a given cell, and f is the upper bound on the number of non-neighboring cells of the given cell that may cause significant interference to a UE operating at an edge of the given cell. Using the vector $v_1$, the designing device may design the pilot $p_1$ for cell 1 (block 820). As an example, the pilot $p_i$ may be expressed as $$p_1 = \frac{v_1}{\|v_1\|_2},$$

where $\|v_1\|_2$ is the magnitude operator that provides the magnitude of vector $v_1$.

If cell 1 already has a pilot or after the designing device designs a pilot for cell 1, the designing device may proceed to block 825, where the designing device may relabel the neighboring cells of cell 1 (block 825). In an example embodiment, the designing device may place each of the neighboring cells of cell 1 into one of two categories: neighboring cells with pilots and neighboring cells without pilots. The cells with pilots are relabeled as cells 2, . . . , Y with pilots $p_2$, . . . , $p_Y$, and the cells without pilots are relabeled as cells Y+1, . . . , Z. Thus, the designing device may interact with two cell groups (a group of neighboring cells of cell 1 with pilots and a group of neighboring cells of cell 1 without pilots). The designing device may initialize a variable K for a first neighboring cell of cell 1 without a pilot (block 830). As an example, variable K may be initialized to value Y+1.

In an example embodiment, the designing device may design pilots for the neighboring cells of cell 1 without pilots. The design of the pilots for the neighboring cells of cell 1 without pilots may include the designing device considering a subspace W that is spanned by pilots $p_1, p_2, \ldots, p_{K-1}$ (block 835). In other words, W is spanned by the pilots of cell 1 and the neighboring cells of cell 1 with pilots. The designing device may also generate vectors $w_1, w_2, \ldots, w_{m-K+1}$ which forms an orthomormal basis of a subspace $W^\perp$, which is an orthogonal complement of subspace W, also denoted W_ORTHOGONAL (block 835). The designing device may also generate a vector $v_K$ that is a linear combination of vectors $w_1, w_2, \ldots, w_{m-K+1}$ (block 835). The vector $v_K$ may be expressed as $$v_K = \Sigma_{i=1}^{m-K+1} a_i w_i,$$

where numbers $a_1, a_2, a_{m-K+1}$ are i.i.d. according to a complex Gaussian distribution N(0, 1).

The designing device may generate a pilot $p_K$ from vector $v_K$ (block 840). The designing device may assign pilot $p_K$ to cell K (block 845). Pilot $p_K$ may be expressed as $$p_K = \frac{v_K}{\|v_K\|_2}.$$

The designing device may move cell K into the category of neighboring cells of cell 1 with pilots. In other words, the designing device may move cell K into the group of neighboring cells of cell 1 with pilots.

The designing device may perform a check to determine if there are more neighboring cells of cell 1 without pilots (block 850). As an example, the designing device may check if the group of neighboring cells of cell 1 without pilots is empty. If there are more neighboring cells of cell 1 without pilots, the designing device may increment K (block 855) and return to block 835 to design a pilot for the next member of the group of neighboring cells of cell 1 without pilots. If there are no more neighboring cells of cell 1 without pilots, operations 800 may end.

Referencing back now to FIG. 7, the designing device may design pilots for other cells in the communications system. The designing device may initialize a variable J that represents a pointer to a cell in the group of neighboring cells other than the selected cell (cell 1) (block 710). However, as the pilot design process continues, on a J-th iteration of the pilot design process, the variable J represents a pointer to the J-th cell in the group of neighbor cells of the selected cell. As an illustrative example, on a first iteration after the designing device designed pilots for the first set $S_1$, i.e., the second iteration of the pilot design process, the variable J may be set to the value 2, meaning that J is a pointer for cell 2 in the group of neighbor cells of the selected cell. Then, after another iteration (i.e., the third iteration of the pilot design process), the variable J may be set to the value 3, meaning that J is a pointer for cell 3 in the group of neighbor cells of the selected cell.

The designing device may design pilots for cell J and its neighboring cells, i.e., set $S_J$ (block 715). According to an example embodiment, the designing device may use the pilot design process described in FIG. 8 to design pilots for cell J and its neighboring cells. As an example, the designing device may design pilots for cell J and its neighbor cells (set $S_J$), which at this point may or may not contain all of the cells of set $S_1$, by initiating the pilot design process illustrated in FIG. 8 with parameters J and set $S_J$ rather than parameters 1 and set $S_1$ as in block 705 which designs pilots for cell 1 and set $S_1$. Cell J may be referred to as a new cell. It is noted that while performing the pilot design process as described in FIG. 8, the designing device refers to cell J as cell 1 to simplify discussion. It is also noted that some or all of the neighboring cells of cell J may not be members of the first set $S_1$; therefore, they may not have pilots. The neighboring cells of cell J (members of the set $S_J$) that are also members of the first set $S_1$ already have pilots (e.g., as a result of operation in block 705) and may be referred to as a subset of the neighbor cells with pilots. As described previously in regard to the discussion of FIG. 8, the pilot design process may design pilots for the neighboring cells of cell J that do not already have pilots. The neighboring cells of cell J with newly designed pilots may be relabeled as cells $d_{J-1}+1, \ldots, d_J$ (block 720). The designing device may also specify a new (or update) set $S_J$ that includes cells 1, 2, ..., $d_J$ (block 725). In other words, the set $S_J$ contains cells that have pilots. The designing device may also relabel remaining cells in the communications system, i.e., cells without pilots, as cells $d_{J+1}, \ldots, N$ (block 725).

The designing device may perform a check to determine if the set $S_{J-1}$ includes all cells in the communications system (block 730). The set $S_{J-1}$ containing all cells in the communications system may be used as a stopping condition indicating that the designing device has designed pilots for all cells in the communications system. If the set $S_{J-1}$ includes all cells in the communications system, the designing device may save information about the pilots (block 735). Alternatively, the designing device may provide the information about the pilots to the cells in the communications system. Alternatively, the designing device may provide the information about the pilots to the cells in the communications system as well as save the information about the pilots. If the set $S_{J-1}$ does not include all cells in the communications system, the designing device may increment J (block 740) and return to block 715 to design pilots for cell J and its neighboring cells. In other words, the designing device selects the next cell in set $S_J$ and designs pilots sequences for cell J and its neighboring cells.

Figure 9:
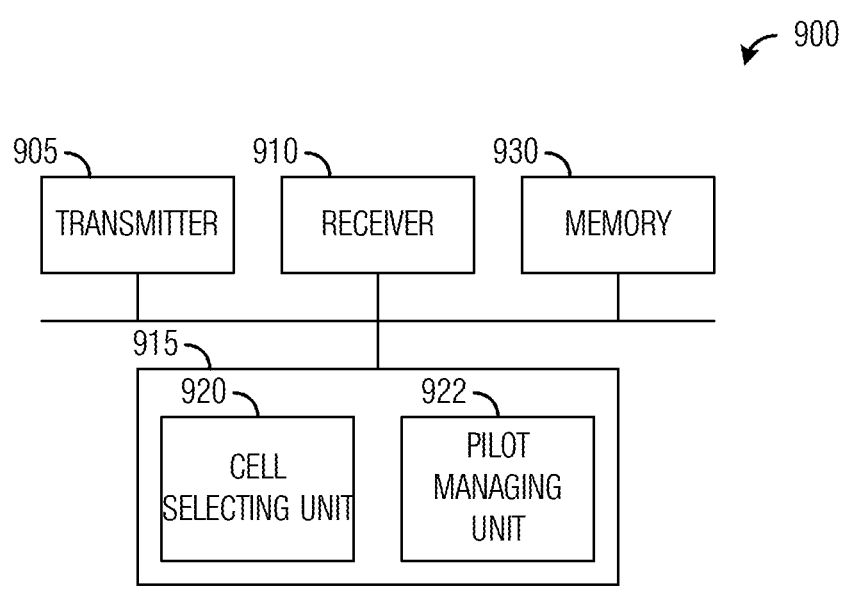
FIG. 9 illustrates an example communications device according to example embodiments described herein.

FIG. 9 illustrates an example communications device 900. Communications device 900 may be an implementation of a designing device, such as a base station, an access point, an NodeB, an eNB, a stand-alone entity or a co-located entity with another device, and the like. Communications device 900 may be used to implement various ones of the embodiments discussed herein. As shown in FIG. 9, a transmitter 905 is configured to transmit packets, pilots, pilot information, and the like. Communications device 900 also includes a receiver 910 that is configured to receive packets, communications channel information, and the like.

A cell selecting unit 920 is configured to select cells in a communications system. Cell selecting unit 920 is also configured to categorize cells and group them in accordance with their interference significance relative to another cell in the communications system. Cell selecting unit 920 is also configured to manage cell groups, including adding and removing cells from groups. A pilot managing unit 922 is configured to select pilots for cells in accordance with their interference significant relative to cells in the communications system and to manage pilot assignments. Pilot managing unit 922 is also configured generate pilot information and control the providing of the pilot information to cells in the communications system. Pilot managing unit 922 is also configured to save the pilot information. A memory 930 is configured to store packets, cells groups, cell categories, pilots, pilot assignments, pilot information, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while cell selecting unit 920 and pilot managing unit 922 may be software modules executing in a microprocessor (such as processor 915) or a custom circuit or a custom compiled logic array of a field programmable logic array. Cell selecting unit 920 and pilot managing unit 922 may be modules stored in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method for pilot sequence design in a communications system, the method comprising:
  selecting, by a designing device, an initial cell in the communications system;
  grouping, by the designing device, other cells in the communications system relative to the initial cell into one of a neighbor group and a non-neighbor group in accordance with a neighborness measure of each of the other cells to the initial cell;
  designing, by the designing device, pilot sequences that are substantially orthogonal to one another for the initial cell and cells in the neighbor group;
  providing, by the designing device, information about the pilot sequences to the initial cell and the other cells in the communications system;
  selecting a first cell in the neighbor group as a new cell, the new cell having a plurality of neighbor cells, wherein a subset of the plurality of neighbor cells are members of the neighbor group and have been assigned pilot sequences;
  adding a remainder of the plurality of neighbor cells to the neighbor group; and
  designing additional pilot sequences for cells in the plurality of neighbor cells that do not have assigned pilot sequences, the additional pilot sequences are substantially orthogonal to one another for the first cell and the plurality of neighbor cells.

2. The method of claim 1, wherein pilot sequences of cells in the non-neighbor group are uniformly distributed throughout a first space substantially orthogonal to a second space spanned by the pilot sequences of the cells in the neighbor group.

3. The method of claim 1, wherein the neighborness measure is determined in accordance with at least one of a geographical criterion, a signal criterion, and an interference criterion.

4. The method of claim 1, wherein the grouping the other cells comprises:
  placing a first other cell into the neighbor group if the neighborness measure of the first other cell to the initial cell meets a threshold; and
  placing the first other cell into the non-neighbor group if the neighborness measure of the first other cell to the initial cell does not meet the threshold.

5. The method of claim 1, wherein the additional pilot sequences are uniformly distributed throughout a third space substantially orthogonal to a fourth space spanned by pilot sequences of cells in the subset of the plurality of neighbor cells that already have been assigned pilot sequences and the pilot sequence of the first cell.

6. The method of claim 1, further comprising repeating the selecting the first cell, the adding, and the designing the additional pilot sequences until the neighbor group comprises all of the cells in the communications system.

7. The method of claim 1, wherein the designing the pilot sequences comprises:
  designing an initial pilot sequence for the initial cell if the initial cell does not already have an assigned pilot sequence; and
  designing the pilot sequences for the other cells in the neighbor group that do not already have assigned pilot sequences.

8. The method of claim 7, wherein the designing the initial pilot sequence comprises:
  generating an m×1 vector $v_1$ with coordinates that are generated in accordance with an independently and identically distributed (i.i.d.) Gaussian with complex distribution N(0, 1), where m is a length of the initial pilot sequence, and N(0,1) is a normal distribution with mean 0 and variance 1; and
  assigning the initial pilot sequence as $$p_1 = \frac{v_1}{\|v_1\|_2},$$

where $p_1$ is the initial pilot sequence, $v_1$ is the m×1 vector, and $\|v_1\|_2$ is magnitude of vector $v_1$.

9. The method of claim 7, wherein the designing the pilot sequences for the other cells in the neighbor group that do not already have assigned pilot sequences comprises:
  selecting a second cell from the other cells in the neighbor group that do not already have assigned pilot sequences;
  generating a second vector $v_2$ that is a linear combination of a plurality of third vectors, wherein the plurality of third vectors form an orthonormal basis of a first subspace that is an orthogonal complement of a second subspace spanned by pilot sequences of the initial cell and the other cells in the neighbor group that do have assigned pilot sequences; and
  assigning a second pilot sequence as $$p_2 = \frac{v_2}{\|v_2\|_2},$$

where $p_2$ is the second pilot sequence, $v_2$ is the second vector, and $\|v_2\|_2$ is magnitude of vector $v_2$.

10. The method of claim 9, wherein the second vector is expressible as $v_2 = \Sigma_{i=1}^{m-2+1} a_i w_i$, where m is a length of the initial pilot sequence, $a_i$ is an i-th number that is generated in accordance with an i.i.d. Gaussian with complex distribution N(0, 1), and $w_i$ is an i-th orthonormal basis vector.

11. The method of claim 9, further comprising repeating the selecting the second cell, the generating the second vector, and the assigning the second pilot sequence for remaining other cells in the neighbor group that do not have assigned pilot sequences.

12. A method for pilot sequence design in a communications system, the method comprising:
  selecting, by a designing device, an initial cell in the communications system;
  grouping, by the designing device, other cells in the communications system into a neighbor group if the other cells in the communications system are determined to be significant interferers to the initial cell;
  grouping, by the designing device, the other cells in the communications system into a non-neighbor group if the other cells in the communications system is determined to be insignificant interferers to the initial cell;
  designing, by the designing device, pilot sequences that are substantially orthogonal to one another for the initial cell and cells in the neighbor group;
  providing, by the designing device, information about the pilot sequences to the initial cell and the other cells in the communications system;
  selecting a first cell in the neighbor group as a new cell, the new cell having a plurality of neighbor cells, wherein a subset of the plurality of neighbor cells are members of the neighbor group and have been assigned pilot sequences;

adding a remainder of the plurality of neighbor cells to the neighbor group; and designing additional pilot sequences for cells in the plurality of neighbor cells that do not have assigned pilot sequences, the additional pilot sequences are substantially orthogonal to one another for the first cell and the plurality of neighbor cells.

13. The method of claim 12, further comprising repeating the selecting the first cell, the adding, and the designing the additional pilot sequences until the neighbor group comprises all of the cells in the communications system.

14. The method of claim 12, wherein pilot sequences of cells in the non-neighbor group are uniformly distributed throughout a first space substantially orthogonal to a second space spanned by the pilot sequences of the cells in the neighbor group.

15. The method of claim 12, further comprising grouping the other cells in the communications system into the neighbor group if the other cells in the communications system are determined to be possibly significant interferers to the initial cell.

16. A designing device comprising:
a processor configured to select an initial cell in a communications system, to group other cells in the communications system relative to the initial cell into one of a neighbor group and a non-neighbor group in accordance with a neighborness measure of each of the other cells to the initial cell, and to design pilot sequences that are substantially orthogonal to one another for the initial cell and cells in the neighbor group;

a transmitter operatively coupled to the processor, the transmitter configured to provide information about the pilot sequences to the initial cell and the other cells in the communications system; and wherein the processor is configured to select a first cell in the neighbor group as a new cell, the new cell having a plurality of neighbor cells, wherein a subset of the plurality of neighbor cells are members of the neighbor group and have been assigned pilot sequences, to add a remainder of the plurality of neighbor cells to the neighbor group, and to design additional pilot sequences for cells in the plurality of neighbor cells that do not have assigned pilot sequences, the additional pilot sequences are substantially orthogonal to one another for the first cell and the plurality of neighbor cells.

17. The designing device of claim 16, wherein the processor is configured to determine the neighborness measure in accordance with at least one of a geographical criterion, a signal criterion, and an interference criterion.

18. The designing device of claim 16, wherein the processor is configured to design an initial pilot sequence for the initial cell if the initial cell does not already have an assigned pilot sequence, and to design the pilot sequences for the cells in the neighbor group that do not already have assigned pilot sequences.

19. The designing device of claim 16, wherein the processor is configured to design pilot sequences of cells in the non-neighbor group so that they are uniformly distributed throughout a first space substantially orthogonal to a second space spanned by the pilot sequences of the cells in the neighbor group.

* * * * *